United States Patent [19]

Kamiya et al.

[11] 4,274,021
[45] Jun. 16, 1981

[54] LIQUID COOLED STATOR WINDING FOR A ROTARY ELECTRIC MACHINE HAVING REDUCED THERMAL ELONGATION STRESSES

[75] Inventors: Hiroyuki Kamiya; Seiji Watanabe; Masatosi Taniguchi; Tomokichi Okawara; Fumitake Aki, all of Hitachi; Yasuyuki Wachi, Takahagi, all of Japan

[73] Assignee: Hitachi, Ltd., Tokyo, Japan

[21] Appl. No.: 18,526

[22] Filed: Mar. 8, 1979

Related U.S. Application Data

[63] Continuation of Ser. No. 775,747, Mar. 9, 1977, abandoned.

[30] Foreign Application Priority Data

Mar. 12, 1976 [JP] Japan ................................ 51-26152

[51] Int. Cl.³ .............................................. H02K 9/00
[52] U.S. Cl. ...................................... 310/54; 310/260
[58] Field of Search .................. 310/54, 52, 51, 58, 310/65, 64, 59, 55, 57, 260, 270

[56] References Cited

U.S. PATENT DOCUMENTS

| | | | |
|---|---|---|---|
| 3,049,634 | 8/1962 | Horsley | 310/260 |
| 3,092,741 | 6/1963 | Horsley | 310/64 |
| 3,112,415 | 11/1963 | Bahn | 310/54 |
| 3,185,872 | 5/1965 | Weissheimer | 310/54 |
| 3,497,737 | 2/1970 | Philofsky | 310/54 |
| 3,614,493 | 10/1971 | Collings | 310/58 |
| 3,634,705 | 1/1972 | Fidei | 310/57 |
| 3,950,665 | 7/1976 | Schneider | 310/260 |

FOREIGN PATENT DOCUMENTS 389765  7/1965  Switzerland ............................ 310/260

*Primary Examiner*—R. Skudy
*Attorney, Agent, or Firm*—Craig and Antonelli

[57] ABSTRACT

A liquid cooled stator winding of a rotary electric machine comprising a stator bar which is composed of a plurality of hollow conductive elements and disposed within a slot of a stator core, and a liquid coolant header fixedly mounted on one end of the stator bar by heat welding. The stator bar is bent adjacent its end in a direction generally normal with respect to its longitudinal direction so as to serve trouble-free over long years of machine operation.

3 Claims, 5 Drawing Figures

LIQUID COOLED STATOR WINDING FOR A ROTARY ELECTRIC MACHINE HAVING REDUCED THERMAL ELONGATION STRESSES

This is a continuation of application Ser. No. 775,747, filed Mar. 9, 1977, now abandoned.

BACKGROUND OF THE INVENTION

This invention relates to an improvement in liquid cooled stator windings of rotary electric machines, and more particularly to a liquid cooled winding of the kind above described in which a liquid coolant header is fixedly mounted by heat welding on the stator bar ends.

The capacity of a modern rotary electric machine such as turbogenerator and water-wheel generator has been increased to such an extent that indirect cooling of the stator winding by circulation of liquid coolant over the insulator covering of the winding is no longer effective in sufficiently removing heat generated by the electrical current flowing through the stator bars. In the modern rotary electric machines, therefore, it is the present tendency to provide cooling passages extending through electrically conductive stator bars thereby furnishing direct cooling by the circulation of liquid coolant such as water or oil. In order to circulate the liquid coolant through the hollow stator bars, headers are provided on suitable portion of the stator bars. These headers are generally mounted on the ends of bars extending outwardly from the stator core in a generally axial direction so that the mounting work thereof can be easily done.

FIGS. 4 and 5 show one form of the bar end arrangement, that is, header arrangement employed heretofore in a rotary electric machine of the kind above described, and are longitudinal sectional views of part of the stator. Referring to FIGS. 4 and 5, a liquid coolant header 5 connects the ends of stator bars 3 and 4 of a stator winding 2 extending outwardly from a stator core 1 in a generally axial direction. The stator bars 3 and 4 are made up of a plurality of hollow conductive elements 20. This header 5 itself is made of an electrical conductive material in order to electrically connect the stator bars 3 and 4 and is fluidly connected by a conduit 6 to a source of liquid coolant, such as a pump or cooler (not shown). The connection between the header 5 of electrical conductive material and the electrically conductive stator bars 3 and 4 must be such that they are sufficiently jointed together both electrically and fluidly, and what is more important is that they must be completely fluid-tight at the joint so as to prevent even slight leakage of liquid coolant. As is well known, periodic inspection on a rotary electric machine, for example, a turbogenerator is carried out only once every several years of operation and hence once it is placed in service, the turbogenerator continues during this long period of time to operate. Therefore, slight leakage or exudation of liquid coolant from the joint will result in attachment of ambient dust to the joint, and the dust thus accumulating which is rather electrically conductive will adversely affect the electrical insulation and will lead to a serious accident such as storing in a worst case.

Careful attention must therefore be directed to leakage of liquid coolant from the cooling passages in the rotary electric machine. Extremely high reliability is thus required for the stator bars. An elaborate experiment made by the inventors in an effort to improve the reliability has proved the following fact. The stator bars are generally jointed to the header by means of brazing. During the heating for the purpose of brazing, however, all of a plurality of conductive elements constituting each stator bar are not necessarily uniformly heated. Especially, in the case of high-frequency induction heating, only some of the conductive element may be heated up to a higher temperature than the other elements depending on the arrangement of the heating coil. As a result, the conductive element or elements heated to higher temperature will be subject to more thermal elongation than the others in an outward direction or away from the stator core and then fixed to the header in the state as it is. In such a case, a residual stress occurs at the connection point of the conductive element or elements subjected to the thermal elongation after brazing. In the rotary electric machine in which violent vibrations occur during operation, the individual conductive elements are not always elongated in an equal amount, and this will impart a further stress to the joint, thereby increasing the overall degree of unbalance at the joint. This additional stress due to the unbalance is combined with the residual stress and vibrations and gives rise to creation of local cracks which lead to undesired leakage of liquid coolant at the joint.

SUMMARY OF THE INVENTION

With a view to obviate such a trouble, it is a primary object of the present invention to provide a liquid cooled stator winding which is mechanically strong and can serve trouble-free over long years of machine operation without requiring any complex arrangement and/or device.

The present invention which attains the above object is featured by the fact that an upper stator bar and a lower stator bar extending from a stator core in a generally axial direction thereof are bent at their end portions in a direction generally normal to the axial direction, and a liquid coolant header having a pair of counterbores directed toward the stator bar ends is fixedly connected to the stator winding ends by heat welding.

DESCRIPTION OF THE PREFERRED EMBODIMENTS

A preferred embodiment of the present invention will now be described in detail with reference to FIGS. 1 and 2.

Figure 1:
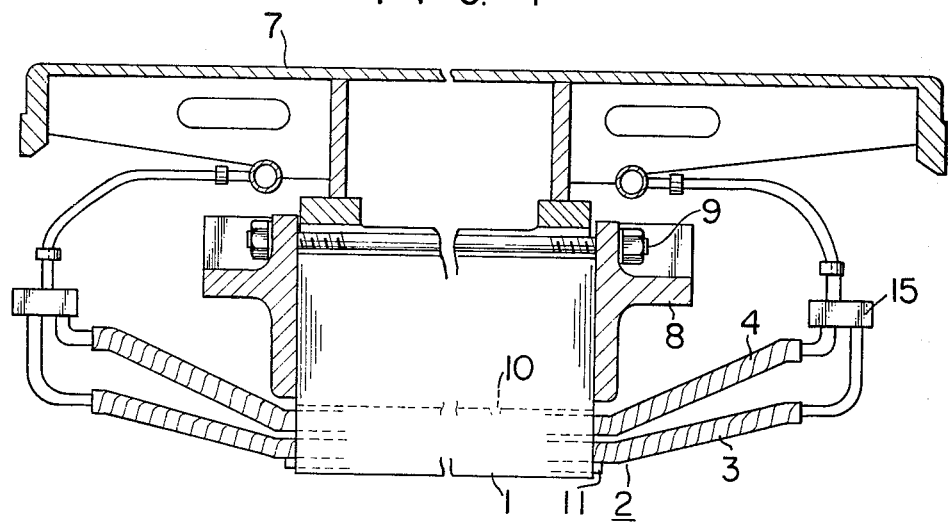
FIG. 1 is a longitudinally sectional, side elevational view of a rotary electric machine to schematically illustrate the arrangement of stator bar ends in the winding according to the present invention.

Referring first to FIG. 1, principal parts of a stator of a rotary electric machine, including a stator frame 7, a stator core 1 and a stator winding 2, are shown in longitudinal section. The stator core 1 is of laminated sheet construction. End plates 8 are fixed to the opposite ends of the stator core 1 by bolts 9, and the integral structure is supported in the stator frame 7 by means of a key (not shown). Axially extending slots 10 are provided in the inner peripheral wall of the stator core 1, and the stator winding 2 is received in these slots 10 with part thereof extending outwardly from the stator core 1 in a generally axial direction. The stator winding 2 comprises a pair of stator bars 3 and 4 each including a plurality of insulated hollow conductive elements 20. The stator bars 3 and 4 are received in the slots 10 in superposed relation and fixedly supported in the stator core 1 by a wedge 11. A liquid coolant header 15 is mounted on the ends 13 and 14 of the stator bars 3 and 4 extending outwardly from the stator core 1 in the generally axial direction so as to connect these stator bars 3 and 4 both electrically and fluidly. In the present invention, this header 15 does not merely connect the ends 13 and 14 of the axially extending stator bars 3 and 4, but it connects such ends in a unique manner as described in detail with reference to FIG. 2.

Figure 2:
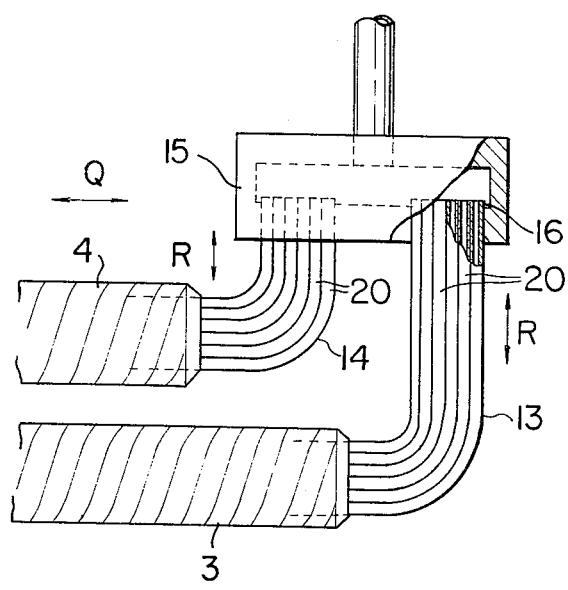
FIG. 2 is an enlarged detail view of the joint between the stator bar ends and the liquid coolant header in FIG. 1.

As will be apparent from FIG. 2, which is an enlarged detail view of the stator bar end arrangement, the end portions 13 and 14 of the stator bars 3 and 4 are bent in a direction generally radial with respect to the axis of the stator core 1, that is, in a direction generally normal with respect to the axially extending portions of the stator bars 3 and 4. The header 15 connecting the bar end portions 13 and 14 has a pair of radial counterbores 16 which have a size slightly larger than that of the stator bar ends 13 and 14 and facing to the stator bar ends, respectively. The header 15 is jointed to the stator bar ends 13 and 14 by inserting them into the associated counterbores 16 and applying, heat welding, for example, brazing to complete a joint which is electrically conductive and free from leakage of liquid coolant. The term "heat welding" is used to indicate any one of fusion welding, welding with heat and pressure, brazing, soldering and the like.

Figure 4:
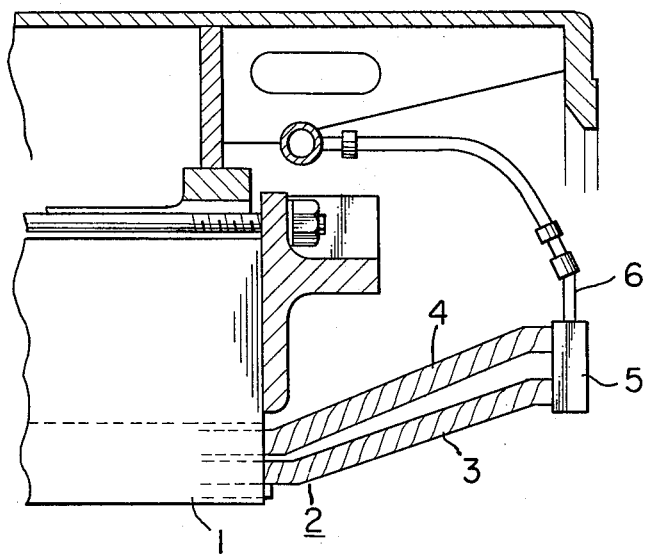
FIG. 4 is a longitudinally sectional, side elevational view schematically illustrating the arrangement of stator bar ends in a conventional winding of this kind.
Figure 5:
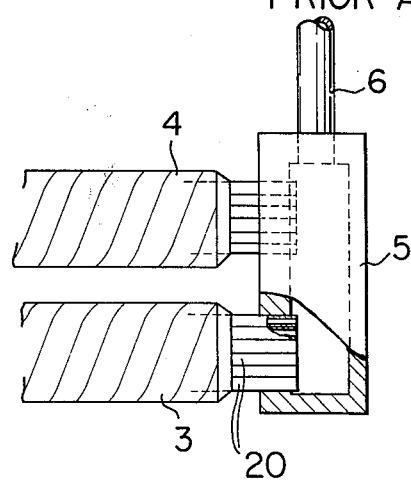
FIG. 5 is an enlarged detail view of the joint between the stator bar ends and the liquid coolant header in FIG. 4.

As shown in an exaggerated fashion in FIG. 2, the conductive elements, constituting the stator bars 3 and 4 are subject to thermal elongation in the radial direction of the stator as shown by the arrow R by the heat applied for brazing, but substantially not to thermal elongation in the longitudinal direction of the stator bars as shown by the arrow Q. Due to this, the axially running portions of the conductive elements tend to be slightly spaced apart from one another without affecting the element portions held tightly by the wedge 11 in the stator core 1. Therefore, a force is rather imparted to the bent portions of the conductive elements in their superposed direction, and its reaction is soft and not so great. Thus, the conductive elements are not fixed under such a state that an undesired force is imparted thereto as in FIGS. 4 and 5, and no residual stress exists. According to the present invention, such stress-free stator bars can be fabricated by steps which are entirely similar to the prior art ones and which are thus neither more complex nor require higher precision than heretofore. These stator bars can also be assembled in a manner entirely similar to the prior art manner of assembling.

While one preferred form of the present invention has been described by way of example, it is apparent to those skilled in the art that various other suitable may be used to provide such stator bar end arrangement.

Figure 3:
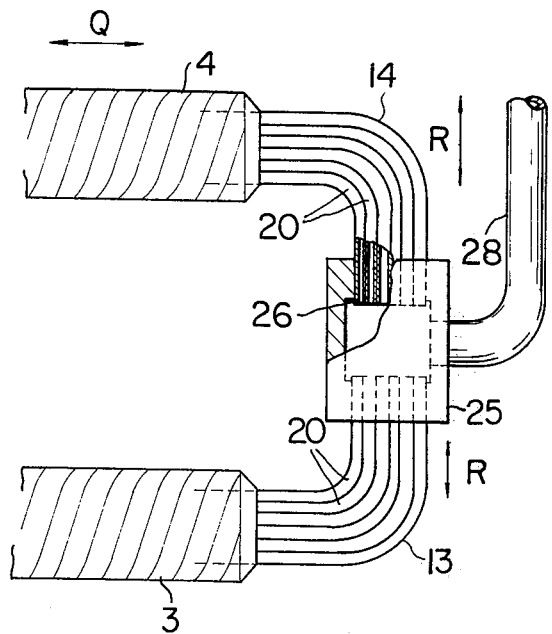
FIG. 3 shows a modification of FIG. 2.

FIG. 3 shows a modification of the embodiment described with reference to FIGS. 1 and 2.

In the modification shown in FIG. 3, the end portions 13 and 14 of the upper and lower stator bars 3 and 4 are also bent in a direction generally radial with respect to the axis of the stator core 1 but extend toward each other, and a liquid coolant header 25 having a pair of radial counterbores 26 facing to the bar ends, respectively, is fixedly connected thereto. A liquid coolant supply pipe 28 is also coupled to the header in a direction substantially perpendicular to the direction in which the stator bars enter the header 25, as shown in FIG. 3.

In this modification too, the stator bars have radially bent portions, and the thermal elongation of the conductive elements acts to impart a force to the bent portions of the conductive elements in the superposed direction. Thus, the modification can also give the same effects as those described with reference to the aforementioned embodiment.

In the embodiments of FIGS. 2 and 3 it is more advantageous that the adjacent conductive elements be spaced apart from one another by a slight gap of, for example, about 0.5 mm in their bent portions than when they are kept in intimate contact with one another in the bent portions. Further, although the direction of bending has been referred to be generally radial with respect to the axis of the stator core 1, it is desirable from the viewpoint of stator bar assembling work that the upper and lower stator bars 3 and 4 be bent in a direction exactly as possible normal with respect to the axis of the stator core 1 so that the bar ends 13 and 14 align on the same line. In this case, the connection is done by inserting the lower stator bar 4 in the slot of the stator core 1, fitting the bar end 14 in the associated counterbore 26 of the header 25, and then inserting the upper stator bar 3 in the slot while fitting the bar end 13 in the associated counterbore 26 of the header 25. Thus, it is preferred that the stator bar ends 13 and 14 are directed substantially in the radial direction of the stator core 1, so that the stator bars 3 and 4 can be inserted in the same direction thereby remarkably facilitating the assembling work thereof.

Various other modifications may be made. According to one of the modifications, the bar ends are bent inwardly in the same direction, and the header is mounted on such bar ends, and according to another modification, the bar end are bent in directions opposite to each other, and the header is mounted on each of such bar ends. The present invention may also be applied to a rotary electric machine of the kind having a single stator bar in each of the stator slots in addition to the machine of the kind referred to above.

It will be understood from the foregoing detailed description that the present invention provides a liquid cooled stator winding assembly of a rotary electric machine in which the ends of hollow stator bars are bent in a direction generally radial with respect to the axis of the stator core, and a liquid coolant header is fixedly mounted on the bar ends by heat welding. According to the present invention, a force is imparted to the bent portions in the superposed direction of the individual conductive elements which are subject to unbalanced thermal elongation during heating for welding to establish the joint between the header and the stator bar ends. The present invention obviates, therefore, such prior art defect that the conductive elements fixed at one end thereof in the stator core make thermal elongation in only and are jointed to the header, in that state leaving a stress at the joint. The liquid cooled stator winding of the present invention is thus highly reliable in that undesirable breakage or cracks hardly occur at the joint over long years of operation of the rotary electric machine under vibrations, thereby reducing the possibility of leakage of liquid coolant from the joint to a minimum.

We claim:

1. A liquid cooled stator winding of a rotary electric machine comprising an upper and a lower stator bar each composed of a plurality of hollow conductive elements, said bars being disposed partly within a slot of a stator core and extending outwardly from the stator core in a generally axial direction thereof, and a liquid coolant header coupled to a coolant pipe for supplying a cooling liquid to the header, said header being fixedly mounted on the ends of said stator bars by heat welding for directly cooling the conductive elements by circulating liquid coolant through the hollow passages of the conductive elements, wherein said stator bars are bent at their end portions to enter said header in a direction generally radial with respect to the axis of the rotary electric machine so as to oppose each other at their ends, and said header is interconnected between the opposed ends of said stator bars, wherein said liquid coolant header comprises a sleeve having a pair of counterbores at its opposite ends with the hollow conductive elements constituting each of said bars being secured, at their end portions, into a respective one of said counterbores of the header.

2. A liquid cooled stator winding as claimed in claim 1, wherein the conductive elements in the bent portions of said stator bars are spaced apart by a slight gap from one another.

3. A liquid cooled stator winding as claimed in claim 1, wherein the coolant pipe is coupled into the header in a direction substantially perpendicular to the direction in which the stator bars enter the header.

* * * * *